US010554543B1

United States Patent
Paul et al.

(10) Patent No.: US 10,554,543 B1
(45) Date of Patent: Feb. 4, 2020

(54) MIGRATING DATA TRAFFIC BETWEEN LABEL SWITCHED PATHS (LSPS) BASED ON PER-LSP PROTOCOL PRIORITY VALUE

(71) Applicant: Juniper Networks, Inc., Sunnyvale, CA (US)

(72) Inventors: Arijit Paul, Cupertino, CA (US); Amit J. Upadhyay, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 204 days.

(21) Appl. No.: 15/699,680

(22) Filed: Sep. 8, 2017

(51) Int. Cl.
| H04L 12/24 | (2006.01) |
| H04L 12/851 | (2013.01) |
| H04L 12/781 | (2013.01) |
| H04L 12/913 | (2013.01) |
| H04L 12/803 | (2013.01) |
| H04L 12/723 | (2013.01) |

(52) U.S. Cl.
CPC .............. *H04L 45/52* (2013.01); *H04L 45/50* (2013.01); *H04L 47/125* (2013.01); *H04L 47/724* (2013.01)

(58) Field of Classification Search
CPC .............................. H04L 45/50; H04L 47/805
See application file for complete search history.

(56) References Cited

U.S. PATENT DOCUMENTS

| 2002/0141345 A1* | 10/2002 | Szviatovszki | H04L 45/00 370/238 |
| 2006/0045024 A1* | 3/2006 | Previdi | H04L 45/02 370/254 |
| 2006/0159009 A1* | 7/2006 | Kim | H04L 12/18 370/216 |
| 2007/0208871 A1* | 9/2007 | Vasseur | H04L 45/04 709/230 |
| 2012/0044811 A1* | 2/2012 | White | H04L 45/02 370/238 |

(Continued)

OTHER PUBLICATIONS

Vasseur et al., "Path Computation Element (PCE) Communication Protocol (PCEP)," RFC 5440, Network Working Group, Mar. 2009, 87 pp.

(Continued)

*Primary Examiner* — Romani Ohri
(74) *Attorney, Agent, or Firm* — Shumaker & Sieffert, P.A.

(57) ABSTRACT

Techniques are described for migrating data traffic, based on a new protocol priority value, from one Label Switched Path (LSP) assigned a higher initial protocol priority value to another LSP assigned a lower initial protocol priority value. For example, a network may initially establish a resource reservation LSP associated with a resource reservation protocol assigned a higher initial protocol priority value than a segment routing protocol used to establish a segment routed LSP. Rather than being unable to send data traffic on an established segment routed LSP because the segment routing protocol has a lower initial protocol priority than the resource reservation protocol, an ingress router may receive from a centralized controller a message specifying a new protocol priority value assigned to the segment routed LSP in response to which the ingress router may create or update its initial protocol priorities, and forward data traffic along the segment routed LSP.

28 Claims, 6 Drawing Sheets

(56) References Cited

U.S. PATENT DOCUMENTS

| | | | | |
|---|---|---|---|---|
| 2012/0250696 A1* | 10/2012 | Gandhi | .................. | H04L 45/50 370/400 |
| 2012/0287776 A1* | 11/2012 | Inaba | ...................... | H04L 45/22 370/217 |
| 2013/0242717 A1* | 9/2013 | Fujii | ..................... | H04L 45/507 370/216 |
| 2015/0146525 A1* | 5/2015 | Shibata | ................. | H04L 45/123 370/230 |
| 2016/0277959 A1* | 9/2016 | Venkataraman | ...... | H04L 45/125 |
| 2016/0337168 A1* | 11/2016 | Rebella | .................. | H04L 45/22 |
| 2017/0317953 A1* | 11/2017 | Sareen | .................... | H04L 49/25 |

OTHER PUBLICATIONS

Awduche et al., "RSVP-TE: Extensions to RSVP for LSP Tunnels," RFC 3209, Network Working Group, Dec. 2001, 61 pp.

Braden et al., "Resource ReSerVation Protocol (RSVP)—Version 1 Functional Specification," RFC 2205, Network Working Group, Sep. 1997, 112 pp.

Filsfils et al., "Segment Routing Architecture, draft-filsfils-rtgwg-segment-routing-00," Internet-Draft, Network Working Group, Jun. 28, 2013, 28 pp.

Filsfils et al., "Segment Routing Use Cases, draft-filsfils-rtgwg-segment-routing-use-cases-01," Internet-Draft, Network Working Group, Jul. 14, 2013, 46 pp.

Filsfils et al., "Segment Routing Architecture, draft-filsfils-spring-segment-routing-04," Internet-Draft, Network Working Group, Jul. 3, 2014, 18 pp.

Previdi et al., "Source Packet Routing in Networking (SPRING) Problem Statement and Requirements," RFC 7855, Internet Engineering Task Force (IETF), May 2016, 19 pp.

Moy, "OSPF Version 2," RFC 2328, Network Working Group, Apr. 1998, 240 pp.

Coltun et al., "OSPF for IPv6," RFC 5340, Network Working Group, Jul. 2008, 94 pp.

Sheth et al., "OSPF Hybrid Broadcast and Point-to-Multipoint Interface Type," RFC 6845, Internet Engineering Task Force (IETF), Jan. 2013, 9 pp.

Lindem et al., "OSPFv3 LSA Extendibility, draft-acee-ospfv3-lsa-extend-01," Internet-Draft, Network Working Group, Jul. 15, 2013, 27 pp.

Oran, "OSI IS-IS Intra-domain Routing Protocol," RFC 1142, Network Working Group, Feb. 1990, 157 pp.

Li et al., "IGP Requirements for Traffic Engineering with MPLS, draft-li-mpls-igp-te-00," Internet-Draft, Network Working Group, Feb. 1999, 6 pp.

Crabbe et al., "PCEP Extensions for Stateful PCE, draft-ietf-pce-stateful-pce-11," Internet-Draft, PCE Working Group, Apr. 20, 2015, 47 pp.

Filsfils et al., "Segment Routing with MPLS data plane, draft-filsfils-spring-segment-routing-mpls-03," Internet-Draft, Network Working Group, Jul. 31, 2014, 14 pp.

\* cited by examiner

MIGRATING DATA TRAFFIC BETWEEN LABEL SWITCHED PATHS (LSPS) BASED ON PER-LSP PROTOCOL PRIORITY VALUE

TECHNICAL FIELD

The disclosure relates to computer networks and, more particularly, to engineering traffic flows within computer networks.

BACKGROUND

A computer network is a collection of interconnected computing devices that exchange data and share resources. In a packet-based network, such as the Internet, computing devices communicate data by dividing the data into small blocks called packets, which are individually routed across the network from a source device to a destination device. The destination device extracts the data from the packets and assembles the data into its original form.

Certain devices within the network, referred to as routers, use routing protocols to exchange and accumulate topology information that describes the network. This allows a router to construct its own routing topology map of the network. Upon receiving an incoming data packet, the router examines keying information within the packet and forwards the packet in accordance with the accumulated topology information.

Many routing protocols fall within a protocol class referred to as Interior Gateway Protocol (IGP) in which flooding-based distribution mechanisms are used to announce topology information to routers within the network. These routing protocols typically rely on routing algorithms that require each of the routers to have synchronized routing topology information for a given domain, referred to as the IGP area or domain. The contents of a Link State Database (LSDB) or a Traffic Engineering Database (TED) maintained in accordance with a link state routing protocol have the scope of an IGP domain. IGP routing protocols typically require that all routers in the IGP routing domain store within an internal LSDB or TED all of the routing information that has been distributed according to the IGP protocol. In operation, each router typically maintains an internal link state database and scans the entire database at a defined interval to generate and output link state messages to synchronize the database to neighboring routers within the routing domain. In this way, link state is propagated across the entire routing domain and stored in full at each router within the domain.

Packet-based networks increasingly utilize label switching protocols for traffic engineering and other purposes. Multi-Protocol Label Switching (MPLS) is a mechanism used to engineer traffic patterns within Internet Protocol (IP) networks according to the routing information maintained by the routers in the networks. By utilizing MPLS protocols, such as the Label Distribution protocol (LDP), the Resource Reservation Protocol (RSVP) with Traffic Engineering extensions (RSVP-TE), label switching routers can forward traffic along a particular path through a network to a destination device, i.e., a Label Switched Path (LSP), using labels prepended to the traffic. An LSP defines a distinct path through the network to carry MPLS packets from the source device to a destination device. Using a MPLS protocol, each router along an LSP allocates a label in association with the destination and propagates the label to the closest upstream router along the path. Routers along the path add (push), remove (pop) or swap the labels and perform other MPLS operations to forward the MPLS packets along the established path.

Routers may additionally, or alternatively, employ segment routing techniques, such as by using a Source Packet Routing in Networking (SPRING) protocol, that provides segment routing within an IGP domain to advertise single or multi-hop LSPs. SPRING includes multiple different label types including "adjacency" labels and "node" labels. To forward a packet through the network, the routers may push, pop, or swap one or more labels in a label stack, e.g., a segment list, that is applied to the packet as it is forwarded through the network.

SUMMARY

In general, techniques are described for migrating data traffic in a network from one Label Switched Path (LSP) to another LSP based on a per-LSP protocol priority value. For example, a network may initially establish a resource reservation LSP associated with a resource reservation protocol (e.g., Resource Reservation Protocol (RSVP)) that is assigned a higher initial protocol priority value than a segment routing protocol (e.g., a Source Packet Routing in Networking (SPRING)) used to establish a segment routed LSP. Regardless of the initial protocol priorities stored in an ingress router to the LSPs, a centralized controller for the network may specify a new protocol priority value for a particular LSP which the ingress router may create or update its initial protocol priorities, and forward data traffic along the particular LSP based on the new protocol priority value.

For example, a customer may desire to migrate data traffic from a resource reservation LSP assigned a higher initial protocol priority value to a segment routed LSP assigned a lower initial protocol priority value. To migrate data traffic to the lower priority segment routed LSP, a centralized controller may receive a request, e.g., from a network operator, to assign a new protocol priority value for the segment routed LSP. The centralized controller may send a message to an ingress router of the resource reservation LSP and the segment routed LSP specifying the new protocol priority value assigned to the segment routed LSP having a higher protocol priority value than the protocol priority value assigned to the resource reservation LSP. The message may be sent concurrently with a request to establish the segment routed LSP or after the segment routed LSP is established.

The centralized controller may establish a configuration session with the ingress router via, e.g., Path Computation Element Protocol (PCEP), to send the message specifying the new protocol priority value assigned to the segment routed LSP. The ingress router receives the message and updates its protocol priorities based on the new protocol priority value specified in the message. Based on the updated protocol priorities, the ingress router may migrate data traffic from the resource reservation LSP to the segment routed LSP even though the segment routed LSP was initially assigned a lower protocol priority value. That is, the controller may send a message specifying a new protocol priority value such that an ingress router may migrate data traffic from one LSP to another LSP regardless of the initial protocol priorities assigned to the LSPs.

In some examples in which multiple LSPs are established with the same protocol, the centralized controller may send a message specifying the protocol priority value on a per-LSP basis instead of a global basis. For example, the centralized controller may send a message to the ingress router such that the ingress router may update its stored protocol priority assigned to a particular segment routed LSP, but may not update the protocol priority assigned to other segment routed LSPs.

In one example, a method includes receiving, by a controller that manages a plurality of network devices in a network along a path of a first Label Switched Path (LSP) established with a first protocol, a request to assign a new protocol priority value to a second LSP associated with a second protocol, wherein an initial protocol priority value assigned to the first LSP and an initial protocol priority value assigned to the second LSP each indicate a priority of the corresponding protocol for routing traffic, and wherein the initial protocol priority value assigned to the first LSP is higher than the initial protocol priority value assigned to the second LSP. The method also includes, in response to receiving the request, sending, by the controller via a configuration session to an ingress router of the first LSP and the second LSP, a message configuring the ingress router to assign the new protocol priority value to the second LSP, the message specifying the new protocol priority value assigned to the second LSP, wherein the new protocol priority value assigned to the second LSP is higher than the initial protocol priority value assigned to the first LSP.

In another example, a method includes establishing, by an ingress router of a plurality of network devices in a network, a first Label Switched Path (LSP) associated with a first protocol. The method also includes receiving, by an ingress router via a configuration session with a controller that manages the plurality of network devices, a message configuring the ingress router to assign a new protocol priority value to a second LSP associated with a second protocol, the message specifying the new protocol priority value assigned to the second LSP, wherein an initial protocol priority value assigned to the first LSP and an initial protocol priority value assigned to the second LSP each indicate a priority of a corresponding protocol for routing traffic, wherein the initial protocol priority value assigned to the first LSP is higher than the initial protocol priority value assigned to the second LSP, and wherein the new protocol priority value assigned to the second LSP is higher than the initial protocol priority value assigned to the first LSP. The method also includes updating, by the ingress router, the initial protocol priority value assigned to the second LSP with the new protocol priority value assigned to the second LSP. The method also includes sending, by the ingress router and based on the new protocol priority value assigned to the second LSP, data traffic on the second LSP.

In another example, a controller that manages a plurality of network devices in a network includes a memory; and one or more processors operably coupled to the memory, wherein the one or more processors are configured to: establish a first Label Switched Path (LSP) associated with a first protocol; receive a request to assign a new protocol priority value to a second LSP associated with a second protocol, wherein an initial protocol priority value assigned to the first LSP and an initial protocol priority value assigned to the second LSP each indicate a priority of a corresponding protocol for routing traffic, and wherein the initial protocol priority value assigned to the first LSP is higher than the initial protocol priority value assigned to the second LSP; and in response to the receipt of the request, send, via a configuration session to an ingress router of the first LSP and the second LSP, a message configuring the ingress router to assign the new protocol priority value to the second LSP, the message specifying the new protocol priority value assigned to the second LSP, wherein the new protocol priority value assigned to the second LSP is higher than the initial protocol priority value assigned to the first LSP.

In another example, a router includes of a plurality of routers includes a memory; and one or more processors operably coupled to the memory, wherein the one or more processors are configured to: establish a first Label Switched Path (LSP) associated with a first protocol; receiving, via a configuration session with a controller that manages the plurality of network devices, a message configuring the ingress router to assign a new protocol priority value to a second LSP associated with a second protocol, the message specifying the new protocol priority value assigned to the second LSP, wherein an initial protocol priority value assigned to the first LSP and an initial protocol priority value assigned to the second LSP each indicate a priority of a corresponding protocol for routing traffic, wherein the initial protocol priority value assigned to the first LSP is higher than the initial protocol priority value assigned to the second LSP, and wherein the new protocol priority value assigned to the second LSP is higher than the initial protocol priority value assigned to the first LSP; update the initial protocol priority value assigned to the second LSP with the new protocol priority value assigned to the second LSP; and send, based on the new protocol priority value assigned to the second LSP, data traffic on the second LSP.

The details of one or more examples are set forth in the accompanying drawings and the description below. Other features, objects, and advantages will be apparent from the description and drawings, and from the claims.

DETAILED DESCRIPTION

Figure 1:
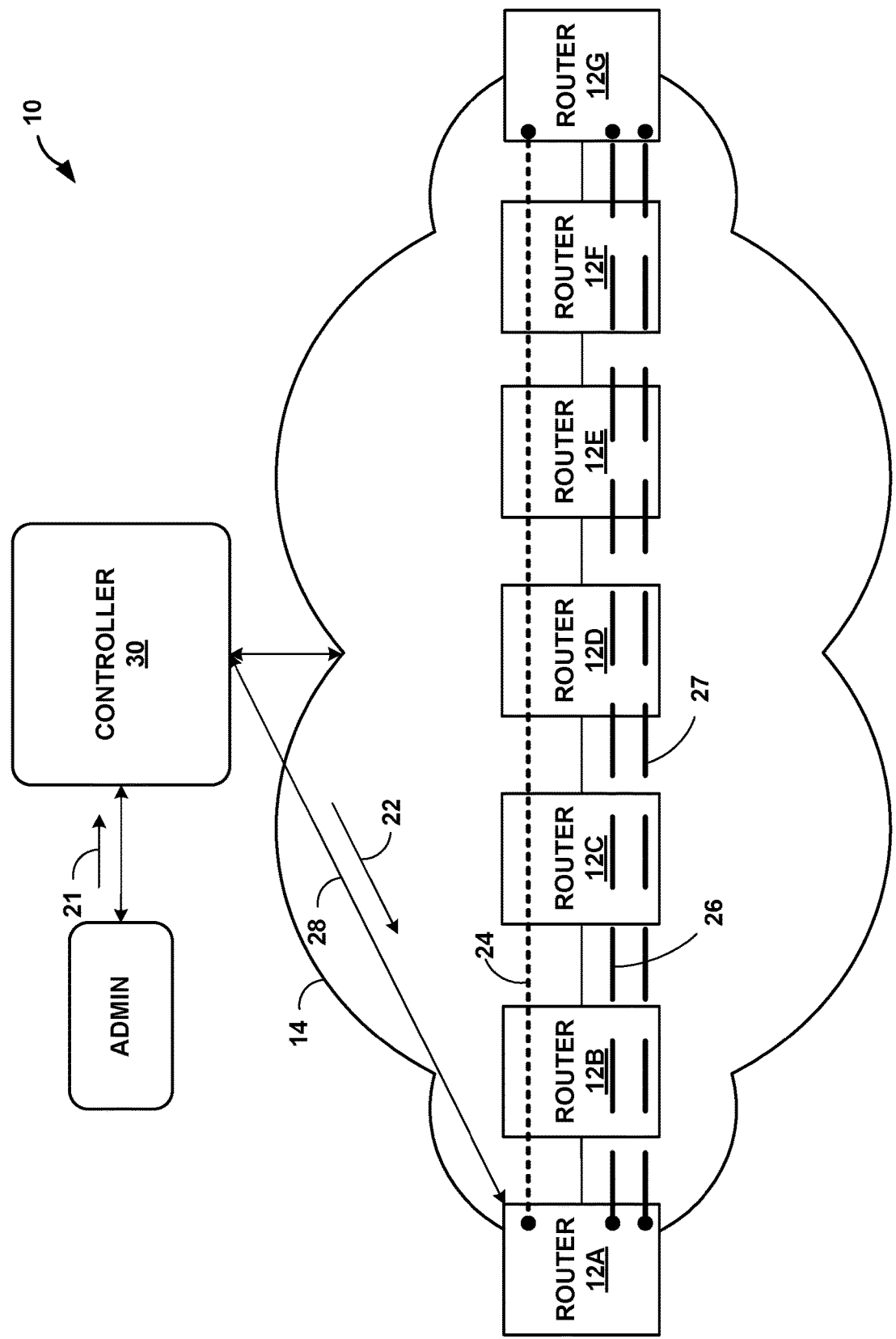
FIG. 1 is a block diagram illustrating an example system for migrating data traffic, based on a new protocol priority value, from an LSP assigned a higher initial protocol priority to another LSP assigned a lower initial protocol priority, in accordance with techniques described in this disclosure.

FIG. 1 is a block diagram illustrating an example system 10 that includes a computer network 14 for migrating data traffic from an LSP to another LSP based on a new protocol priority value, in accordance with techniques described in this disclosure. Network 14 may include routers 12A-12G ("routers 12") to establish one or more LSPs associated with a resource reservation protocol, segment routing protocol, or other routing protocols. In the example of FIG. 1, network 14 may establish a resource reservation LSP 24 associated with a resource reservation protocol (e.g., Resource Reservation Protocol (RSVP)) that is assigned a higher initial protocol priority than a segment routing protocol (e.g., Source Packet Routing in Networking (SPRING)) used to establish a segment routed LSP.

The sources of the network traffic received by ingress router 12A may comprise one or more devices (not shown) and/or any public or private network or the Internet that provides traffic to ingress router 12A in network 14. The destinations of the network traffic being forwarded on LSPs may comprise one or more destination devices and/or network that may include LANs or wide area networks (WANs) that comprise a plurality of devices. For example, destination devices may include personal computers, laptops, workstations, personal digital assistants (PDAs), wireless devices, network-ready appliances, file servers, print servers or other devices that access the source via network 14.

In the example of FIG. 1, system 10 includes a controller 30, which may be a centralized controller that computes Traffic Engineering (TE) LSPs. For example, a router 12 may initially compute a path for a configured TE LSP and signal the TE LSP in the network system using a resource reservation protocol, such as the Resource Reservation Protocol with Traffic Engineering extensions (RSVP-TE), to reserve resources along the computed path and establish a TE LSP, e.g., RSVP LSP 24, to carry traffic mapped to the LSPs. To establish RSVP LSP 24 between routers 12A and 12G, ingress router 12A may issue, via a configuration session, e.g., a path computation element protocol (PCEP) session, a path computation request to controller 30 for RSVP LSP 24. For each requested RSVP LSP, the path computation request may include a required bandwidth, a setup/holding priority, the source and destination network addresses, delegation and administration flags, administrative data, and metric data. Controller 30 may reply with a computed path for the requested LSP when the controller 30 determines a path using the learned traffic information that satisfies the constraints.

Upon receiving a response from controller 30, ingress router 12A uses a resource reservation protocol to signal RSVP LSP 24 along the computed path. Additional details regarding PCEP may be found in "Path Computation Element (PCE) Communication Protocol (PCEP)," Network Working Group, Request for Comment 5440, March 2009; and in "PCEP Extensions for Stateful PCE," version 11, PCE Working Group of the Internet Engineering Task Force, Apr. 20, 2015; which are incorporated herein by reference in their respective entireties. Additional details regarding RSVP-TE may be found in "RSVP-TE: Extensions to RSVP for LSP Tunnels", Network Working Group, Request for Comments 3209, December 2001; and in "Resource ReSerVation Protocol (RSVP)," Network Working Group, Request for Comments 2205, September 1997, which are each incorporated herein by reference in their respective entireties.

In some examples, controller 30 may additionally, or alternatively, use segment routing techniques, e.g., Source Packet Routing in Networking (SPRING) protocol, for establishing an LSP, e.g., segment routed LSP 26. For example, segment routing techniques are used to configure labels for paths from ingress router 12A to egress router 12G. Segment routing within an IGP domain (e.g., network 14) allows routers to advertise single or multi-hop LSPs within the IGP domain such as a segment routing LSP. For segment routing, the "path" information is disseminated between the routers as part of the IGP link state information for the domain. Routers are able to steer packets through a controlled set of instructions, called segments, by prepending a segment routing header (e.g., label) to the packets. Segment routing allows routers to enforce a flow through any topological path and service chain while maintaining per-flow state only at the ingress node to the segment routing domain.

One potential advantage of segment routing may be that the segment routing architecture can be directly applied to the Multi-protocol Label Switching (MPLS) data plane with no change in the forwarding plane. A network administrator ("ADMIN") need only allocate one node segment per router and the segment routing Interior Gateway Protocol (IGP) control-plane automatically builds the required MPLS forwarding constructs from a router to any other router. Segment routing is further described in Filsfils et. al., "Segment Routing Architecture," Internet-Draft draft-filsfils-rtgwg-segment-routing-00, June 2013, while Segment Routing use cases are described in Filsfils et. al., "Segment Routing Use Cases," Internet-Draft draft-filsfils-rtgwg-segment-routing-use-cases-01, July 2013, the entire contents of each of which are incorporated herein by reference. Further details regarding SPRING are found in (1) "Segment Routing Architecture," IETF draft: draft-filsfils-spring-segment-routing-04, Jul. 3, 2014; (2) S. Previdi, et al., "Source Packet Routing in Networking (SPRING) Problem Statement and Requirements," RFC 7855, May 201; and (3) "Segment Routing with MPLS data plane," IETF draft: draft-filsfils-spring-segment-routing-mpls-03, Aug. 1, 2014, the entire contents of each of which are incorporated by reference herein.

In the example of FIG. 1, routers 12 that are included in a segment routing domain may forward traffic on SPRING LSPs associated with the SPRING protocol. Routers 12 support SPRING forwarding along routed paths within network 10. SPRING includes multiple different label types including "adjacency" labels and "node" labels. To forward a packet through network 10, routers that are SPRING enabled may push, pop, or swap one or more labels in a label stack (e.g., a "segment list") that is applied to the packet as it is forwarded through the network. The label stack may encode the topological and service source route of the packet.

Different types of SPRING labels are further described hereinafter. An adjacency label may have a local semantic to a particular segment routing node, such as one of routers 12. In particular, an adjacency label steers traffic onto an adjacency (e.g., communication link and/or interface) or set of adjacencies. Thus, an adjacency label may be related to a particular router. To use an adjacency label, a router may initially assign the adjacency label to a particular adjacency and advertise the adjacency label to other routers in the segment routing domain using Intermediate System-Intermediate System (ISIS) protocol or the Open Shortest Path First (OSPF) protocol. The router may be the only router in the segment routing domain to use the particular adjacency label. When a router forwards a packet using the adjacency label, the router may cause the packet to use the adjacency for the router associated with the adjacency label. In this way, adjacency labels may be used to establish one-hop tunnels within network 10.

A node label, by contrast, may have a global semantic within a segment routing domain. That is, each of routers 12 that are SPRING enabled may be assigned a defined node label range (commonly referred to as Segment Routing Global Block (SRGB)) that is unique to each respective router within the segment routing domain. An operator of network 10 may ensure unique allocation of the different node label ranges from a global range to different routers. In addition to a node label range, each particular router may also have a specific node identifier that uniquely identifies the particular router in the segment routing domain. Each respective router may advertise its respective node identifier and node label range to other routers in the segment routing domain using ISIS or OSPF.

Based on routes determined using, e.g., shortest path routing, each of routers 12 may configure its forwarding state to push, pop, or swap node labels (corresponding to other nodes in the network) onto packets to forward such packets using the determined route to the destination. For instance, each of routers 12 may perform path selection using topology information learned by way of IGP to compute a shortest path within network 10 on a hop-by-hop basis based on the routing information maintained by the routers. Each of routers 12 may then select a next hop along the locally computed shortest path and install forwarding information associated with the selected next hop in a forwarding plane of the router, wherein the forwarding information identifies a network interface to be used when forwarding traffic and one or more labels to be applied when forwarding the traffic out the interface. The routers use the next hops with the assigned labels to forward traffic hop-by-hop.

To illustrate the use of node labels, egress router 12G may typically advertise its node segment identifier (node SID) to each of routers 12. Each of routers 12A-12F may typically install the node SID in its forwarding state. Router 12A may inject a packet into network 10 that is destined for router 12G with the node SID for router 12G Router 12A determines, based on a node label associated with the node SID for router 12G that a shortest path to router 12G includes router 12B as the next-hop. Router 12A may apply a node label that indicates the node identifier for router 12G and the node label may be within a label range assigned to 12B.

In some examples, the node label is encoded to indicate both the node identifier and that the label is within a particular label range. Upon receiving the packet, router 12B may determine, based on the node label and stored forwarding information, a forwarding action. As an example, router 12B may determine that the forwarding information indicates a forwarding action of swapping the node label, which was previously applied by router 12A, for a label that indicates the node identifier for router 12G and the new label may be within a label range assigned to 12C. In some examples, forwarding action indicates the node label is swapped for an identical node label. The packet is processed and forwarded in a similar manner by each of routers 12 on the path from router 12A to router 12G When router 12G receives the packet, router 12G may pop the node label from the packet and forward the packet to the destination. In this way, any router in the segment routing domain may forward a packet to any other router in the network by applying the appropriate node label.

In some examples, a customer or network operator may send a request 21 to controller migrate data traffic from an LSP assigned with a higher initial protocol priority value, e.g., RSVP LSP 24, to another LSP assigned with a lower initial protocol priority value, e.g., SPRING LSP 26. Routers 12 may store priorities for a corresponding protocol for routing traffic along one or more LSPs. For example, each of routers 12 may be pre-configured (e.g., by the router vendor) with initial protocol priority values to prioritize LSPs implemented with a particular protocol. In the example of FIG. 1, each of routers 12 may be configured with a priority value for a resource reservation protocol that is higher than a priority value for a segment routing protocol. Based on this priority, ingress router 12A typically determines the active route for forwarding network traffic by selecting the route established with the higher prioritized protocol. For example, ingress router 12A determines that data traffic is forwarded on RSVP LSP 24 instead of SPRING LSP 26 because RSVP LSP 24 is assigned with a higher protocol priority value. When a customer or operator requests to migrate data traffic from RSVP LSP 24 to SPRING LSP 26, ingress router 12A is typically unable to send data traffic on SPRING LSP 26 since SPRING LSP 26 is assigned a lower protocol priority value than RSVP LSP 24.

In accordance with the techniques described in this disclosure, controller 30 may send a message to ingress router 12A that specifies a new protocol priority value such that ingress router 12A may modify an initial protocol priority assigned to a particular LSP with the new protocol priority value. Based on the new protocol priority value, ingress router 12A may forward data traffic on the particular LSP regardless of its initial protocol priority.

In the example of FIG. 1, a customer or network operator may request to migrate data traffic from RSVP LSP 24 assigned with a higher initial protocol priority value to SPRING LSP 26 assigned with a lower initial protocol priority value. To migrate data traffic to SPRING LSP 26, the customer or network operator may request to assign a new protocol priority value assigned to SPRING LSP 26. In some examples, the request may be sent concurrently with a request to establish SPRING LSP 26 with the new protocol priority value. In other examples, the request may be sent after RSVP LSP 24 and SPRING LSP 26 are already established.

In response to receiving the request to assign a new protocol priority value, controller 30 may send a message 22, e.g., an extended PCEP update message, specifying the new protocol priority value to ingress router 12A that directs ingress router 12A to assign the new protocol priority value to SPRING LSP 26. Controller 30 may establish a configuration session 28, e.g., via PCEP, with ingress router 12A to send to ingress router 12A the message 22 specifying a new protocol priority value that indicates a priority of a particular protocol assigned to a particular LSP for routing traffic. In the example of FIG. 1, controller 30 may send an extended PCEP update message 22 specifying a new protocol priority value (e.g., a higher protocol priority value than the initial protocol priority value assigned to the resource reservation protocol) assigned to SPRING LSP 26.

In some examples, the PCEP update message may include a Stateful Request Parameters (SRP) object, a Label Switched Path (LSP) object, and a path object. The SRP object may include information to correlate between update requests sent by controller 30 and the error reports and state reports sent by routers 12. The path object may include an Explicit Route Object (ERO) that includes path information of the TE LSP through the network, and an attribute list that includes bandwidth, metrics, TE LSP attributes, and information specifying whether the computed path must traverse a set of specified routers. The LSP object may include information that specifies the target LSP, e.g., the LSP name or LSP ID, the operation to be performed on the LSP, and LSP delegation. As further described below, the LSP object may also specify a new protocol priority value for the LSP. For example, the LSP object may include a Type, Length, and Value ("TLV") that specifies a new protocol priority value that indicates the priority for a protocol assigned to a particular LSP for which data traffic may be forwarded. Additional information regarding the PCEP update message is described in "PCEP Extensions for Stateful PCE," incorporated above. Although the protocol priority information is described as included in a TLV of an LSP object, the protocol priority information may also be included in a TLV, or similar format, of a vendor-proprietary protocol.

When ingress router 12A receives the extended PCEP update message 22 from controller 30 specifying the new protocol priority value, ingress router 12A may modify its stored initial protocol priorities based on the new protocol priority value specified in the PCEP update message. For example, the extended PCEP update message 22 may specify a new protocol priority value assigned to SPRING LSP 26 that indicates the priority for SPRING LSP 26 is higher than the priority for the resource reservation protocol. Additionally, or alternatively, the message 22 may specify a new protocol priority value assigned to RSVP LSP 24 that includes a lower protocol priority value than the initial protocol priority value assigned to the segment routing protocol. In any event, ingress router 12A may receive the extended PCEP update message 22 and may update an initial protocol priority with the new protocol priority value. As such, ingress router 12A may forward data traffic on SPRING LSP 26 even though the segment routing protocol had a lower initial priority than the resource reservation protocol. In this way, ingress router 12A may migrate data traffic from one LSP to another LSP regardless of their initial protocol priorities.

Controller 30 can configure ingress router 12A to modify stored protocol priorities on a per-LSP basis using the techniques described herein. In some examples, controller 30 may send a message 22 specifying the new protocol priority value on a per-LSP basis instead of a global basis. For example, system 10 may include a second SPRING LSP 27. Continuing the example above, controller 30 may send a message 22 to ingress router 12A that specifies a new protocol priority assigned to SPRING LSP 26. In this way, ingress router 12A may update its stored protocol priority assigned to SPRING LSP 26, but may not globally update the protocol priority for segment routed LSPs, e.g., SPRING LSP 27.

Figure 2:
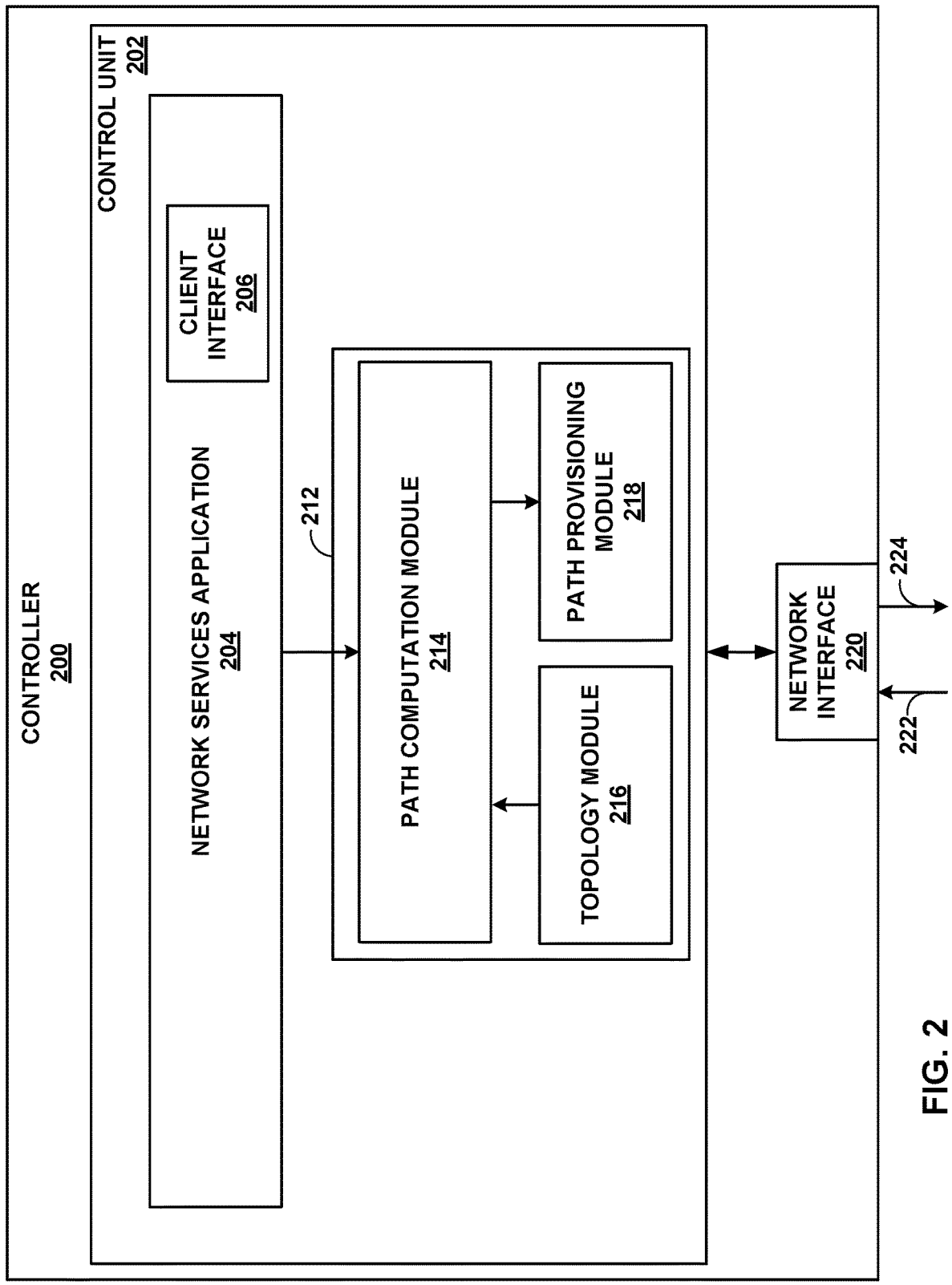
FIG. 2 is a block diagram illustrating an example controller capable of operating in accordance with the techniques described herein.

FIG. 2 is a block diagram illustrating an example of a controller capable of operating in accordance with the techniques described in this disclosure. Controller 200 may include a server or network controller, for example, and may represent an example instance of controller 30 of FIG. 1.

In the example of FIG. 2, controller 200 includes a control unit 202 coupled to a network interface 220 to exchange packets with other network devices by inbound link 222 and outbound link 224. Control unit 202 may include one or more processors (not shown in FIG. 2) that execute software instructions, such as those used to define a software or computer program, stored to a computer-readable storage medium (not shown in FIG. 2), such as non-transitory computer-readable mediums including a storage device (e.g., a disk drive, or an optical drive) or a memory (such as Flash memory or random access memory (RAM)) or any other type of volatile or non-volatile memory, that stores instructions to cause the one or more processors to perform the techniques described herein. Alternatively, or additionally, control unit 202 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 202 provides an operating environment for network services applications 204 and path computation element 212. In one example, these modules may be implemented as one or more processes executing on one or more virtual machines of one or more servers. That is, while generally illustrated and described as executing on a single controller 200, aspects of these modules may be delegated to other computing devices.

Network services applications 204 represent one or more processes that provide services to clients of a service provider network that includes controller 200 to manage connectivity in the aggregation domain (alternatively referred to as the "path computation domain") according to techniques of this disclosure. Network services applications 204 may provide, for instance, Voice-over-IP (VoIP), Video-on-Demand (VOD), bulk transport, walled/open garden, IP Mobility Subsystem (IMS) and other mobility services, and Internet services to clients of the service provider network. Networks services applications 204 require services provided by path computation element 212, such as node management, session management, and policy enforcement. Each of network services applications 204 may include client interface 206 by which one or more client applications request services. Client interface 206 may represent a command line interface (CLI) or graphical user interface (GUI), for instance. Client interface 206 may also, or alternatively, provide an application programming interface (API) such as a web service to client applications.

Network services applications 204 issue path requests to path computation element 212 to request paths in a path computation domain controlled by controller 200. In one example, controller 200 may receive a customer's request to assign a new protocol priority value to a segment routed LSP service provided by network services applications 204.

Path computation element 212 accepts path requests from network services applications 204 to establish paths between the endpoints over the path computation domain. To compute and establish paths through the path computation domain, path computation element 212 includes topology module 216 to receive topology information describing available resources of the path computation domain.

Path computation module 214 of path computation element 212 computes requested paths through the path computation domain. For example, path computation module 214 may compute a resource reservation LSP or segment routed LSP from router 12A to router 12G Path provisioning module 218 may program forwarding information to data planes of routers 12 based on the computed LSP. Provisioning the LSP may require path validation prior to committing the path to provide for packet transport.

As further described below, a user may, via client interface 206, use path provisioning module 218 to specify a new protocol priority value assigned to the computed LSP. In one instance, path provisioning module 218 may specify the new protocol priority value in a PCEP update message. For example, path provisioning module 218 may specify the new protocol priority value in a TLV of an LSP object or in a TLV of a vendor-specified object. The message may direct the ingress router to assign the new protocol priority value to the computed LSP. In this way, path computation element 212 may send a message to an ingress router that specifies a new protocol priority value such that the ingress router may update its initial protocol priorities with the new protocol priority value and may migrate data traffic based on the updated protocol priorities.

Figure 3:
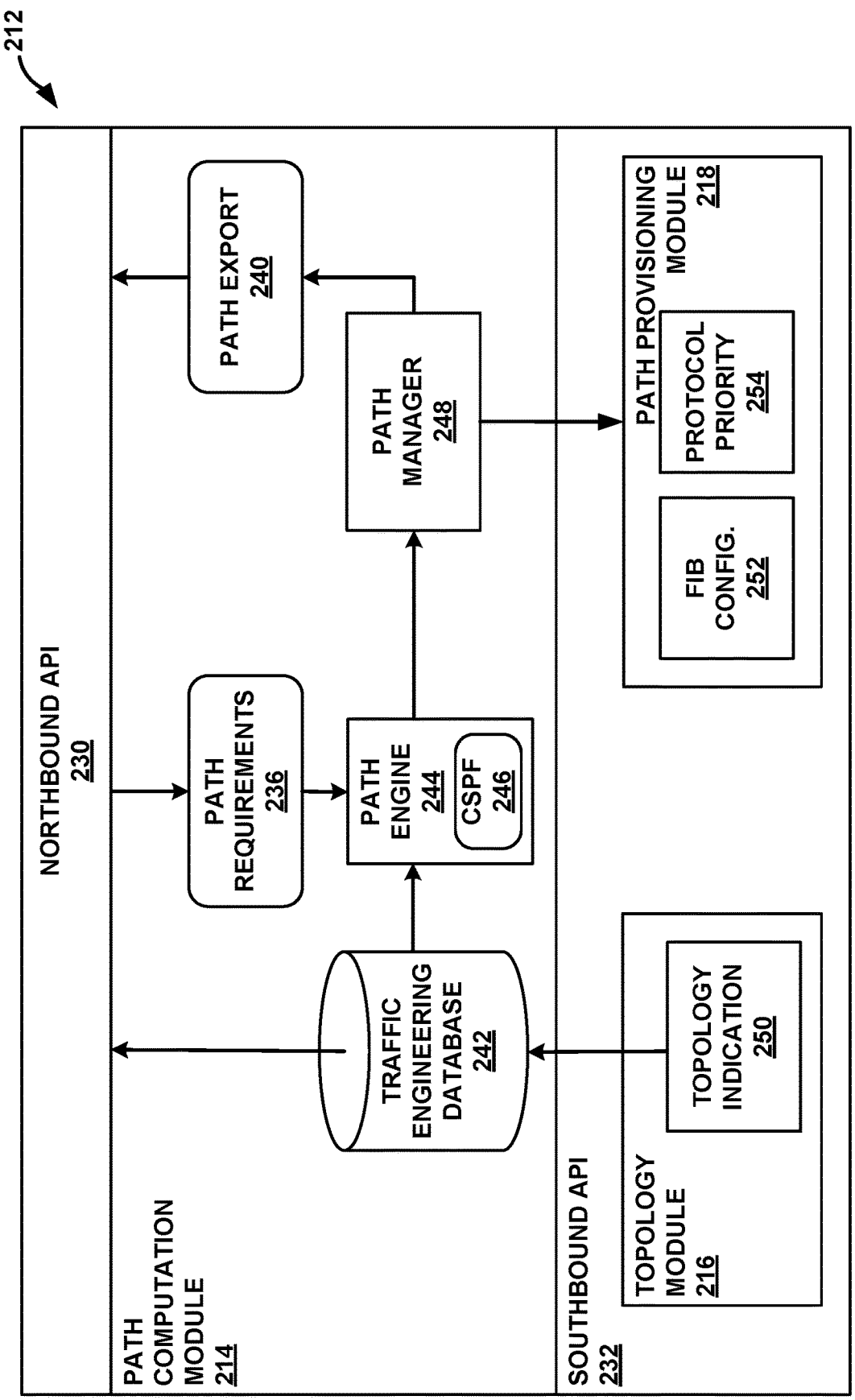
FIG. 3 is a block diagram illustrating an example implementation of a path computation element of a controller, in accordance with the techniques described in this disclosure.

FIG. 3 is a block diagram illustrating an example implementation of path computation element 212 of controller 200 of FIG. 2 in further detail. In this example, path computation element 212 includes northbound and southbound interfaces in the form of northbound application programming interface (API) 230 and southbound API 232. Northbound API 230 includes methods and/or accessible data structures by which network services applications 204 may configure and request path computation within the path computation domain. Southbound API 232 includes methods and/or accessible data structures by which path computation element 212 receives topology information for the path computation domain and establishes paths by accessing and programming data planes of routers, e.g., routers 12, within the path computation domain.

Path computation module 214 includes path requirements 236 and path export 240. Although FIG. 3 is illustrated with only path requirements 236 and path export 240, path computation module 214 may include additional data structures not shown, such as a constraints data structure that describes external constraints (e.g., bandwidth) upon path computation such that network services applications 204 can modify link attributes before path computation module 214 computes a set of paths, an operational configuration data structure that provides configuration information to path computation element 214 to configure the path computation algorithm with respect to, for example, class of service (CoS) descriptors and detour behaviors Network services applications 204 may invoke northbound API 230 to install/query data from these data structures. For example, network services applications 204 may request a resource reservation LSP or segment routed LSP. Path requirements 236 represents an interface that receives path requests for paths to be computed by path computation module 214 and provides these path requests (including path requirements) to path engine 244 for computation. Path requirements 236 may be received, or may be handled by path computation element 212. In such instances, a path requirement message may include a path descriptor having an ingress router identifier and egress router identifier for the routers terminating the specified path.

Path export 240 represents an interface that stores path descriptors for all paths currently committed or established in the path computation domain. In response to queries received via northbound API 230, path export 240 returns one or more path descriptors. Queries received may request paths between any two routers of the path(s). In some examples, path descriptors may be used by network services applications 204 to set up forwarding configuration at the ingress and egress routers of the path(s). A path descriptor may include an Explicit Route Object (ERO). A path descriptor or "path information" may be sent, responsive to a query from an interested party. A path export message delivers path information. In response to receiving the path descriptor, the receiving device may use a resource reservation protocol, e.g., RSVP, or a segment routing protocol, e.g., SPRING to signal an MPLS LSP. For example, in response to receiving the path descriptor, ingress router 12A may use RSVP to signal an RSVP LSP or use SPRING to signal a segment routed LSP.

Topology module 216 includes topology indication module 250 to handle topology discovery. Topology indication module 250 may include an interface to describe received topologies to path computation module 214. Topology indication module 250 may use a topology discovery protocol to describe the path computation domain topology to path computation module 214. Topology indication module 250 may include a routing protocol process that executes a routing protocol to receive routing protocol advertisements, such as Open Shortest Path First (OSPF) or Intermediate System-to-Intermediate System (IS-IS) link state advertisements (LSAs) or Border Gateway Protocol (BGP) update messages.

Traffic engineering database (TED) 242 may store information received by topology indication module 250, for a network that constitutes a path computation domain for controller 200. For example, TED 242 may store to a computer-readable storage medium (not shown). TED 242 may include one or more link-state databases (LSDBs), where link and node data is received in routing protocol advertisements, received from a topology server, and/or discovered by link-layer entities such as an overlay controller and then provided to topology indication module 250. In some examples, controller 200 may use ISIS or BGP-LS to peer into LSDBs stored in routers 12 to determine the topology information rather than importing the topology information into TED 242. In some examples, controller 200 may store topology information separate from TED 242.

In general, to compute a segment routed LSP, path engine 244 determines, based on TED 242 and all specified constraints, whether there exists a path in the layer that satisfies the TE specifications for the requested path. Path engine 244 may use the Dijkstra constrained SPF (CSPF) 246 path computation algorithms for identifying satisfactory paths though the path computation domain. If a satisfactory computed path for the requested path exists, path engine 244 provides a path descriptor for the computed path to path manager 248 to establish the path using path provisioning module 218. A path computed by path engine 244 may be referred to as a "computed" path, until such time as path provisioning 218 programs the scheduled path into the network, whereupon the scheduled path becomes an "active" or "committed" path. A scheduled or active path is a temporarily dedicated bandwidth channel for the scheduled time in which the path is, or is to become, operational to transport flows.

Path manager 248 establishes computed paths using path provisioning module 218. In the example of FIG. 3, path provisioning module 218 includes a forwarding information base (FIB) configuration module 252 (illustrated as "FIB CONFIG 252"). FIB configuration module 252 programs forwarding information to data planes of routers of the path computation domain. FIB configuration module 252 may implement, for instance, a software-defined networking (SDN) protocol such as PCEP to provide and direct the nodes to install forwarding information to their respective data planes. FIB configuration module 252 may in addition, or alternatively, implement other interface types, such as a Network Configuration (NETCONF) interface, a Simple Network Management Protocol (SNMP) interface, a Device Management Interface (DMI), a CLI, an Interface to the Routing System (I2RS), or any other node configuration interface.

FIB configuration module 252 establishes communication sessions with routers 12 to install forwarding information in accordance with information received from path computation module 214. For example, a FIB 252 may use PCEP to establish a PCEP configuration session with ingress router 12A to provide router 12A with an explicit route object (ERO) defining the path for the segment routed LSP between routers 12A and 12G. In this way, router 12A may use the ERO and routing protocol, e.g., SPRING or RSVP, to establish the computed LSP.

Protocol priority module 254 may be invoked by path computation module 214 to generate a new protocol priority value assigned to a particular LSP. Protocol priority module 254 may use PCEP to establish a PCEP configuration session with ingress router 12A to provide router 12A with a configuration message, e.g., PCEP message, specifying a new protocol priority value that indicates a new priority for a protocol (e.g., segment routing protocol) assigned to a particular LSP (e.g., SPRING LSP 26). In some examples, path priority module 254 may specify a new protocol priority value in a Type, Length, and Value of an LSP object that names a particular LSP, e.g., SPRING LSP 26, for which the new protocol priority value is assigned. In some examples, path priority module 254 may specify a new protocol priority value in a Type, Length, and Value of a vendor-specified object. In any event, path priority module 254 may specify an alphanumeric value that indicates a new priority value (e.g., a higher value, a lower value, or any value indicating a preferred priority) assigned to a particular LSP. In response to receiving the configuration message, ingress router 12A may modify its stored initial protocol priorities with the new protocol priority value such that ingress router 12A may forward data traffic on the particular LSP based on the new protocol priority generated by protocol priority module 254.

In some examples, protocol priority module 254 may receive current priorities from a router, e.g., ingress router 12A, in the network. For example, protocol priority module 254 may receive current priorities stored within ingress router 12A, e.g., initial protocol priorities specified by a vendor or protocol priorities updated by the controller.

Figure 4:
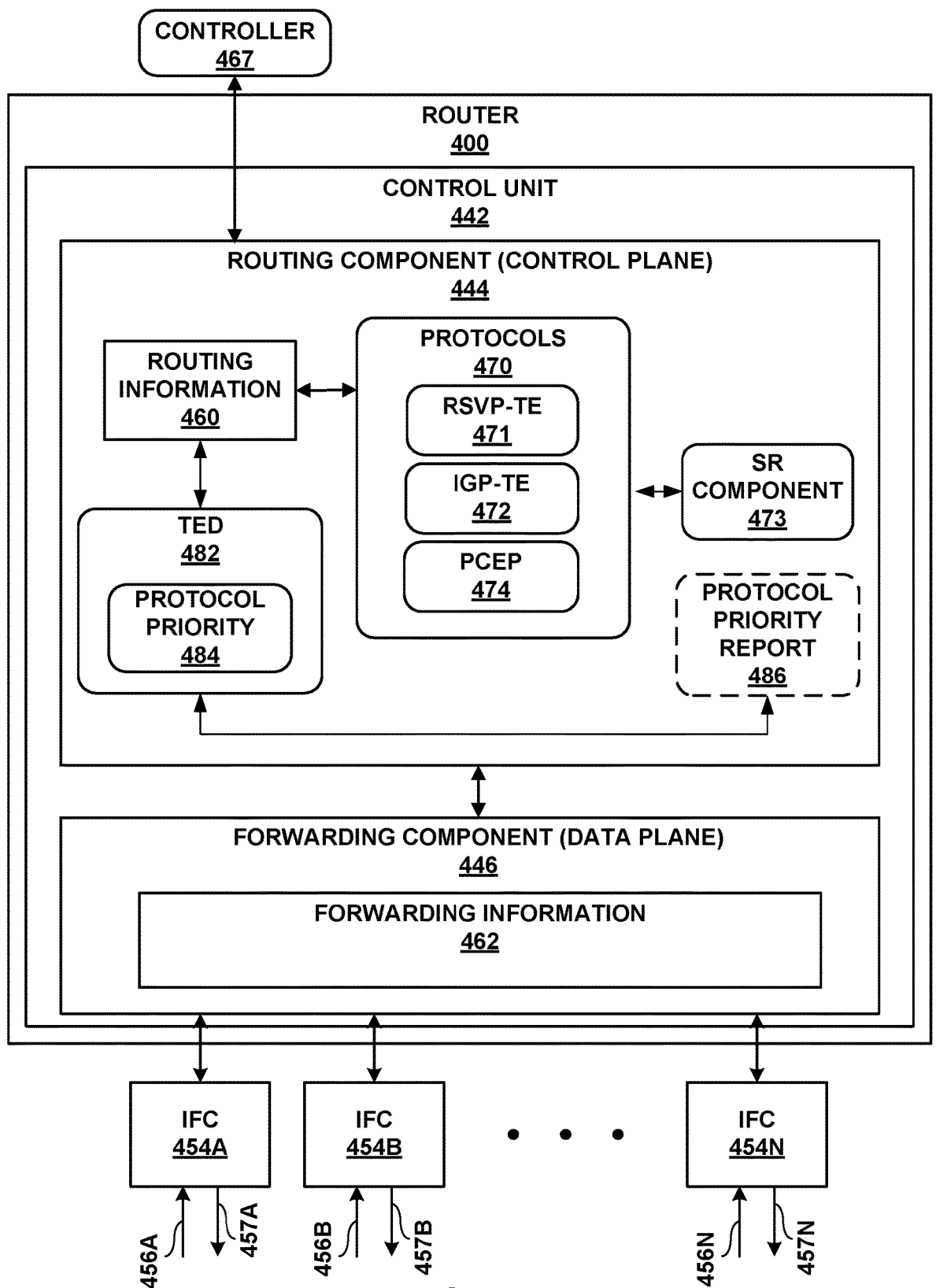
FIG. 4 is a block diagram illustrating an example router capable of operating in accordance with the techniques described herein.

FIG. 4 is a block diagram illustrating an example router 400 that performs various aspects of the techniques described in this disclosure. Router 400 may represent any of routers 12 of FIG. 1. While described with respect to router 400, the techniques may be implemented by any other type of network device capable of implementing at least routing protocols including a resource reservation protocol or segment routing protocol. Thus, while described with respect to router 400, the techniques should not be limited to router 400 described with respect to the example of FIG. 4.

In the example of FIG. 4, router 400 includes interface cards 454A-454N ("IFCs 454") that receive and send data units, such as packet flows, via network links 456A-456N and 457A-457N, respectively. Router 400 may include a chassis (not shown) having a number of slots for receiving a set of cards, including IFCs 454. Each card may be inserted into a corresponding slot of the chassis for electrically coupling the card to routing component 444 via high-speed switch (not shown), which may comprise, for example, switch fabric, switchgear, a configurable network switch or hub, or other high-speed switching mechanisms. IFCs 454 may be coupled to network links 456A-456N and 457A-457N via a number of physical interface ports (not shown). Generally, IFCs 454 may each represent one or more network interfaces by which router 400 may interface with links of a network.

In general, router 400 may include a control unit 442 that determines routes of received packets and forwards the packets accordingly via IFCs 454. In the example of FIG. 4, control unit 442 includes routing component 444 (control plane) that configures and controls packet forwarding operations applied by packet forwarding component 446 (data plane).

Routing component 444 provides an operating environment for various routing protocols 450 that execute at different layers of a network stack. Routing component 444 is responsible for the maintenance of routing information 460 to reflect the current topology of a network and other network entities to which router 400 is connected. In particular, routing protocols periodically update routing information 460 to accurately reflect the topology of the network and other entities based on routing protocol messages received by router 400. The protocols may be software processes executing on one or more processors. For example, routing component 444 includes network protocols that operate at a network layer of the network stack, which are typically implemented as executable software instructions.

In the example of FIG. 4, protocols 470 may include Resource Reservation Protocol with Traffic Extensions (RSVP-TE) protocol 471 to establish RSVP-TE LSPs (e.g., RSVP LSP 26 of FIG. 1). For example, routing component 444 may use RSVP-TE 471 to generate and send Path and Resv messages for establishing RSVP LSPs.

Protocols 470 may also include IGP-TE 472 to implement an IGP protocol with traffic engineering extensions to exchange link state information, and facilitate forwarding of packets or other data units between endpoint devices. In some examples, IGP-TE component 472 may include an OSPF routing protocol in accordance with one or more of the RFC 2328, by J. Moy, entitled "OSPF Version 2," dated April 1998, RFC 5340, by R. Coltun et al. entitled "OSPF for IPv6," dated July 2008, RFC 6845, by N. Sheth et al., entitled "OSPF Hybrid Broadcast and Point-to-Multipoint Interface Type," dated January 2013, and Internet Draft for the Network Working Group, by A. Lindem et al., entitled "OSPFv3 LSA Extendibility," dated July 2013, draft-acee-ospfv3-lsa-extend-01.txt, each of which are incorporated by reference as if set forth in their respective entireties. In some examples, IGP-TE component 472 may include an IS-IS routing protocol that implements an IGP for exchanging routing and reachability information within a routing domain in accordance with RFC 1142, by D. Oran, entitled "OSI IS-IS Intra-domain Routing Protocol," dated February 1990, which is incorporated by reference in its entirety. IGP-TE component may include traffic extensions that support traffic engineering with Multi-protocol Label Switching (MPLS), as described in Internet Draft for Network Working Group, by Tony Li et al., entitled "IGP Requirements for Traffic Engineering with MPLS," dated February 1999, draft-li-mpls-igp-te-00.txt, which is incorporated by reference in its entirety.

Protocols 470 may also include configuration protocols. For example, protocols 470 may include PCEP 374. Protocols 470 may include other routing protocols (not shown), such as routing information protocol (RIP), border gateway protocol (BGP), or other network protocols.

In some examples in which router 400 supports a SPRING protocol, routing component 444 includes a segment routing (SR) component 473 to implement segment routing techniques for IGP protocols (e.g., IS-IS and OSPF) for specifying how router 400 may advertise node or adjacency labels. As described in FIG. 1, these node or adjacency labels may steer a packet through a controlled set of instructions, called segments, by prepending the packet with a segment routing header.

By executing the routing protocols, routing component 444 identifies existing routes through the network and determines new routes through the network. Routing component 444 stores routing information 460 that includes, for example, known routes through the network. Forwarding component 446 stores forwarding information 462 that includes destinations of output links 457. Forwarding information 462 may be generated in accordance with routing information 460.

Routing component 444 may include a Traffic Engineering Database (TED) 482 for storing e.g., path information for resource reservation LSPs or segment routed LSPs. In some examples, TED 482 may store protocol priority information 484. For example, protocol priority information 484 may store priority values of protocols. Priority values may be pre-configured, e.g., via vendors, or updated in accordance with the techniques described herein. As described below, router 400 may receive an extended PCEP update message specifying one or more new protocol priority values associated with particular LSP IDs for which router 400 may modify the protocol priority information 484 associated with the specified LSPs within TED 482. TED 482 may be in the form of a variety of data structures, such as a number of tables, link lists, radix trees, databases, flat files, or other data structures.

In accordance with the techniques described in this disclosure, a controller 467 (e.g., controller 30 of FIG. 1), may establish a PCEP configuration session with router 400. Router 400 may establish a PCEP configuration session with controller 467 in which router 400 may receive path configuration information, e.g., provisioning information, from controller 467 to establish LSPs, e.g., RSVP or SPRING LSPs, or to update protocol priorities. Router 400 may update routing information 460, forwarding information 462, and/or TED 482 based on the path configuration information.

As described above in FIG. 3, router 400 may receive, e.g., a PCEP update message specifying a new protocol priority value from controller 467 for a particular LSP. Based on the new protocol priority value for the LSP, router 400 may update protocol priority information 484 associated with an LSP ID of the LSP stored in TED 482. The protocol priority value may, e.g., be in alphanumeric form or the like.

Router 400 may rely on information in TED 482 to forward data traffic on an LSP. In one example, router 400 may store in protocol priority information 484 initial protocol priority values in which the segment routing protocol has a lower priority than the resource reservation protocol. Router 400 may receive a configuration message, e.g., a PCEP update message, specifying a new protocol priority value assigned to SPRING LSP 26 having a higher priority value than the initial protocol priority value assigned to RSVP LSP 24.

Router 400 may receive a PCEP update message instructing router 400 to assign SPRING LSP 26 with the new protocol priority value. In some examples, router 400 may receive the PCEP update message concurrently with a request to establish SPRING LSP 26. In this example, router 400 may store the new priority value assigned to SPRING LSP 26 in protocol priority information 484. As such, router 400 may determine from protocol priority information 484 that the priority value assigned to SPRING LSP 26 is higher than the priority value assigned to RSVP LSP 24 and may forward data traffic on SPRING LSP 26. In some examples, router 400 may use SR component 473 to generate segment routing messages to establish SPRING LSP 26 assigned with the new protocol priority value.

In another example, router 400 may receive a PCEP update message from controller 467 instructing router 400 to assign a new priority to a previously established SPRING LSP 26. In the absence of this message from controller 467, router 400 may be unable to forward data traffic using the SPRING LSP 26 because the protocol priority value assigned to SPRING LSPs generally, and thus SPRING LSP 26, is lower than the protocol priority value assigned to RSVP LSPs generally, and thus to RSVP LSP 24. Router 400 may receive a PCEP update message instructing router 400 to assign a new priority value to SPRING LSP 26. Router 400 may store the new priority value assigned to SPRING LSP 26 in protocol priority information 484. As such, router 400 may determine from protocol priority information 484 that the priority value assigned to SPRING LSP 26 is higher than the priority value assigned to RSVP LSP 24, and may, based on the new protocol priority value, forward data traffic on SPRING LSP 26. In this way, router 400 may migrate data traffic from one LSP to another LSP based on a new protocol priority value, regardless of initial protocol priorities.

In some examples, router 400 may inform the current priorities to the controller 467. Router 400 may include a protocol priority report module 486 to send the current values stored in protocol priority information 484 to controller 467. For example, protocol priority report module 486 may specify the current protocol priority values in a PCEP report message. In some examples, protocol priority report module 486 may specify the current protocol priority values as a TLV of an LSP object.

Although described for purposes of example with respect to a router, router 400 may be more generally a network device having routing functionality, and need not necessarily be a dedicated routing device. The architecture of router 400 illustrated in FIG. 4 is shown for example purposes only. The techniques of this disclosure are not limited to this architecture. In other examples, router 400 may be configured in a variety of ways. In one example, some of the functionally of control unit 442 may be distributed within IFCs 454. In another example, control unit 442 may comprise a plurality of packet forwarding engines operated as slave routers.

Control unit 442 may be implemented solely in software, or hardware, or may be implemented as a combination of software, hardware, or firmware. For example, control unit 442 may include one or more processors that execute program code in the form of software instructions. In that case, the various software components/modules of control unit 442 may comprise executable instructions stored on a computer-readable storage medium, such as computer memory or hard disk.

Figure 5:
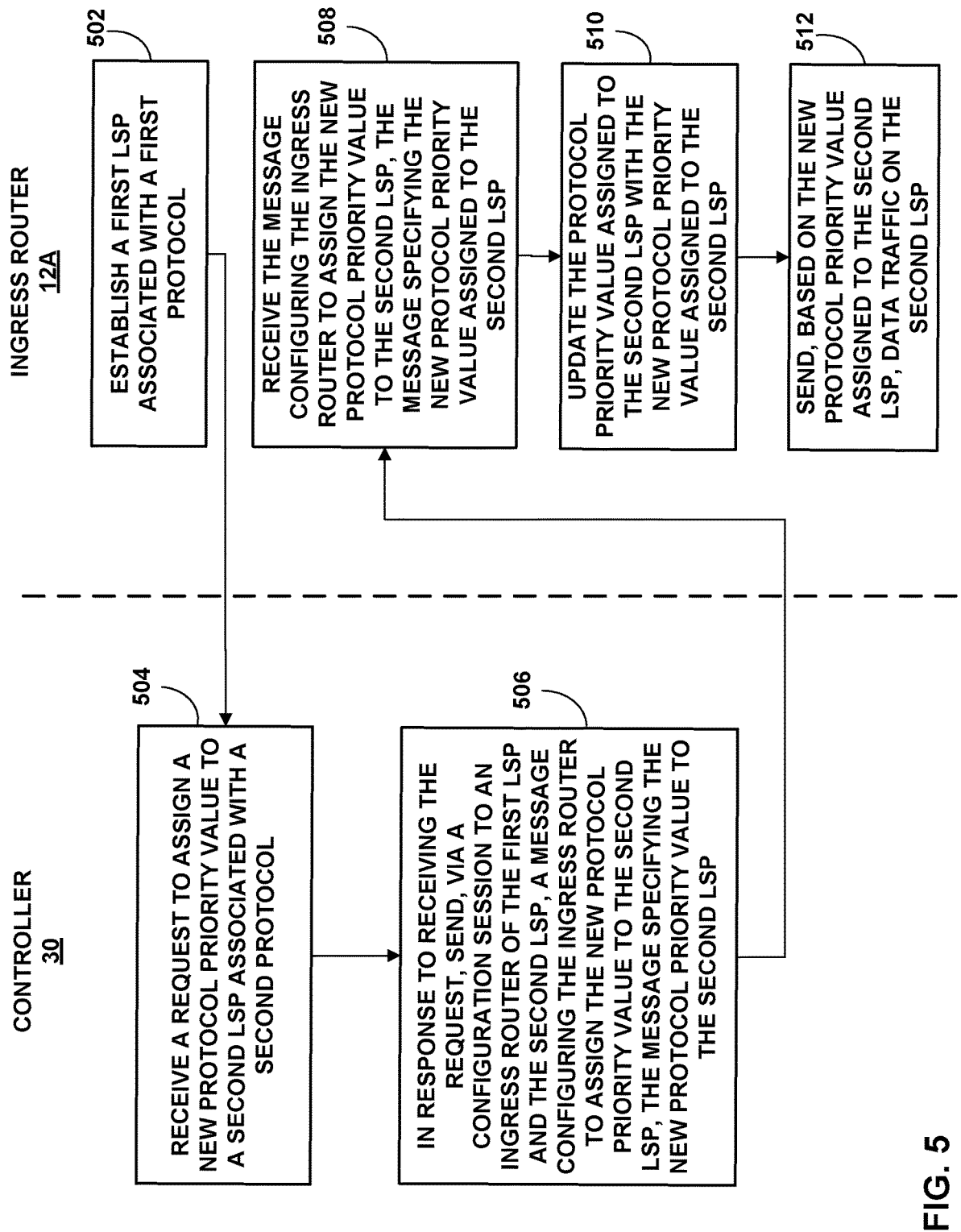
FIG. 5 is a flowchart illustrating an example operation for migrating data traffic from an LSP assigned with a higher initial protocol priority to another LSP assigned with a lower initial protocol priority, in accordance with the techniques described in this disclosure.

FIG. 5 is a flowchart illustrating an example of an operation for migrating data traffic from an LSP assigned with a higher initial protocol priority value to another LSP assigned with a lower initial protocol priority value, in accordance with the techniques described in this disclosure. FIG. 5 will be explained with reference to controller 30 of FIG. 1 (or controller 200 of FIG. 2) and path computation element 212 of FIG. 3.

A network may include a plurality of network devices along a path of a first LSP established with a first protocol. For example, ingress router 12A may establish a first LSP, e.g., RSVP LSP 24, associated with a first protocol, e.g., resource reservation protocol (502). Ingress router 12A may forward data traffic along RSVP LSP 24 based on pre-configured protocol priorities stored in ingress router 12A. In this example, ingress router 12A may store a pre-configured priority value for resource reservation protocol that is higher than the pre-configured priority value for segment routing protocol. Controller 30 may receive a request to assign a new protocol priority value to a second LSP associated with a second protocol (504). For example, controller 30 may receive from a network administrator (or another entity) a request (e.g., request 21 of FIG. 1) to assign a new priority value for segment routing protocol for SPRING LSP 26. In one instance, controller 30 may receive a request to assign a new priority value assigned to a pre-established LSP such that SPRING LSP 26. In another instance, the request may include a request to establish SPRING LSP 26 such that SPRING LSP 26 is established and assigned the new protocol priority value for which data traffic may be migrated to SPRING LSP 26. In any event, data traffic may migrate data traffic from RSVP LSP 24 to SPRING LSP 26 based on the new protocol priority value specified in the message.

In response to receiving the request, controller 30 may send, via a configuration session to an ingress router of the first LSP and the second LSP, a message configuring the ingress router to assign the new protocol priority value to the second LSP, the message specifying the new protocol priority value to the second LSP (506). For example, controller 30 may send a PCEP update message, via a PCEP session with ingress router 12A, that specifies a new priority value for segment routing protocol assigned to SPRING LSP 26 that is higher than the priority value for the resource reservation protocol assigned to RSVP LSP 24. In some examples, controller 30 may specify the new protocol priority value in a Type, Length, and Value of an LSP object, or in a Type, Length, and Value of a vendor-specified object.

Ingress router 12A receives the message configuring ingress router 12A to assign the new protocol priority value to the second LSP, e.g., SPRING LSP 26, the message specifying the new protocol priority value assigned to the second LSP (508). For example, ingress router 12A may receive the PCEP update message specifying the new protocol priority value assigned to SPRING LSP 26 that is higher than the protocol priority value assigned to RSVP LSP 24.

Ingress router 12A may update the protocol priority value (e.g., the initial protocol priority value) assigned to the second LSP with the new protocol priority value assigned to the second LSP (510). For example, ingress router 12A may update the initial priority value stored in its TED with the new protocol priority value for segment routing protocol assigned to SPRING LSP 26.

Ingress router 12A may then send data traffic on the second LSP, e.g., SPRING LSP 26, based on the new protocol priority value assigned to the second LSP (512). In this way, ingress router 12A may migrate data traffic from one LSP to another LSP regardless of the initial protocol priorities.

Figure 6:
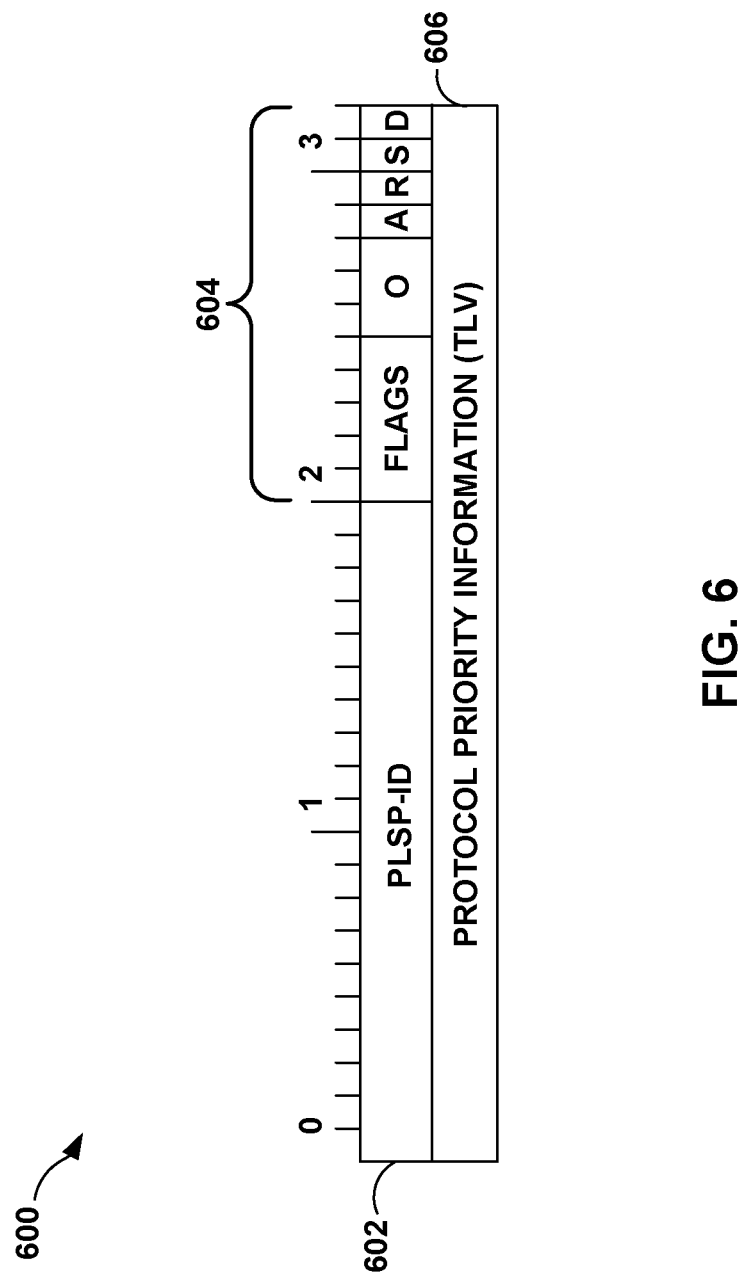
FIG. 6 is a block diagram illustrating an example Type, Length, Value of an extended PCEP message, in accordance with the techniques described in this disclosure.

FIG. 6 is a block diagram illustrating an example PCEP message 600 extended to include protocol priority information, in accordance with the techniques described herein. In the example of FIG. 6, PCEP message 600 may represent a Label Switched Path (LSP) object including protocol priority information 606 that is sent by controller 30 to a router, e.g., ingress router 12A, via a PCEP session such as PCEP session 28. Further examples of the LSP object is described in "PCEP Extensions for Stateful PCE," version 11, PCE Working Group of the Internet Engineering Task Force, Apr. 20, 2015, incorporated above.

PCEP message 600 may include information to specify the target LSP, the operation to be performed on the LSP, and LSP delegation. For example, packet 600 may include a PCEP-specific identifier 602 ("PLSP-ID") for the LSP. For example, the PCEP-specific identifier 602 may include respective unique identifiers for RSVP LSP 24 and SPRING LSP 26.

PCEP message 600 may also include flags field 604. For example, flags field 604 may further include a delegate flag ("D"), a sync flag ("S"), a remove flag ("R"), an administrative flag ("A"), and an operational flag ("O"). Setting the delegate flag indicates that ingress router 12A is delegating the LSP to controller 30. The sync flag indicates a state synchronization between the ingress router 12A and controller 30. The remove flag may indicate that the LSP is removed and controller 30 should remove all state from its database. The administrative flag indicates ingress router 12A's target operational status for the LSP. For example, a value of '1' means that the desired operation state is active, and a value of '0' means that the desired operational state is inactive. The operational flag indicates the operational status of the LSP. For example, a value of '0' indicates that the operational status is down and not active, a value of '1' indicates that the operational status is up and signaled, a value of '2' indicates that the operational status is active (i.e., up and carrying traffic), a value of '3' indicates the operational status is going down (i.e., LSP is being torn down, resources are being released), and a value of '3' indicates the operational status is going up (i.e., LSP is being signaled).

Protocol priority information field 606 may be in a Type, Length, and Value format. For example, type field indicates the field the message represents. Length field represents the size of the value field. Value field may represent the protocol priority information described below.

Protocol priority information field 606 may include information such as one or more new protocol priority values assigned to one or more LSPs. For example, the protocol priority information field 606 may specify an alphanumeric priority value for a segment routing protocol assigned to SPRING LSP 26 that indicates SPRING LSP 26 is preferred over RSVP LSP 24. For example, the alphanumeric priority value may include a higher value, a lower value, or any value indicating a preferred priority. Additionally, or alternatively, the protocol priority information field 606 may specify an alphanumeric priority value for a resource reservation protocol assigned to RSVP LSP 24 that is lower (or less preferred) than a priority value assigned to SPRING LSP 26. In this way, controller 30 may send the PCEP message 600 specifying one or more new protocol priority values for which the ingress router 12A may receive and update its initial protocol priorities based on the TLV in protocol priority information field 606, and forward data traffic along the path of SPRING LSP 26.

The techniques described herein may be implemented in hardware, software, firmware, or any combination thereof. Various features described as components, units or modules may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software components or hardware components.

Various aspects of the techniques have been described. These and other aspects are within the scope of the following claims.

What is claimed is:

1. A method comprising:
   receiving, by a controller that manages a plurality of network devices in a network along a path of a first Label Switched Path (LSP) established with a first protocol, a request to assign a new protocol priority value to a second LSP associated with a second protocol, wherein an initial protocol priority value assigned to the first LSP and an initial protocol priority value assigned to the second LSP each indicate a priority of the corresponding protocol for routing traffic, and wherein the initial protocol priority value assigned to the first LSP is higher than the initial protocol priority value assigned to the second LSP; and
   in response to receiving the request, sending, by the controller via a configuration session to an ingress router of the first LSP and the second LSP, a message configuring the ingress router to assign the new protocol priority value to the second LSP, the message specifying the new protocol priority value assigned to the second LSP, wherein the new protocol priority value assigned to the second LSP is higher than the initial protocol priority value assigned to the first LSP.

2. The method of claim 1,
   wherein receiving the request to assign the new protocol priority value to the second LSP further comprises receiving the request as part of a request to establish the second LSP associated with the second protocol, and
   wherein sending the message comprises sending the message configuring the ingress router to establish the second LSP.

3. The method of claim 1,
   wherein the first LSP comprises a Resource Reservation Protocol (RSVP) LSP, and
   wherein the second LSP comprises a Source Packet Routing in Networking (SPRING) LSP.

4. The method of claim 1, wherein sending the message via the configuration session comprises sending a Path Computation Element Protocol (PCEP) update message via a PCEP session between the controller and the ingress router.

5. The method of claim 4, wherein sending the PCEP update message comprises sending a Type, Length, and Value of an LSP object that includes the new protocol priority value assigned to the second LSP.

6. The method of claim 4, wherein sending the PCEP update message comprises sending a Type, Length, and Value of a vendor-specified object that includes the new protocol priority value assigned to the second LSP.

7. The method of claim 1,
   wherein the message further comprises a new protocol priority value assigned to the first LSP, and
   wherein the new protocol priority value assigned to the first LSP is lower than the new protocol priority value assigned to the second LSP.

8. A method comprising:
   establishing, by an ingress router of a plurality of network devices in a network, a first Label Switched Path (LSP) associated with a first protocol;
   receiving, by an ingress router via a configuration session with a controller that manages the plurality of network devices, a message configuring the ingress router to assign a new protocol priority value to a second LSP associated with a second protocol, the message specifying the new protocol priority value assigned to the second LSP,
      wherein an initial protocol priority value assigned to the first LSP and an initial protocol priority value assigned to the second LSP each indicate a priority of a corresponding protocol for routing traffic,
      wherein the initial protocol priority value assigned to the first LSP is higher than the initial protocol priority value assigned to the second LSP, and
      wherein the new protocol priority value assigned to the second LSP is higher than the initial protocol priority value assigned to the first LSP;
   updating, by the ingress router, the initial protocol priority value assigned to the second LSP with the new protocol priority value assigned to the second LSP; and
   sending, by the ingress router and based on the new protocol priority value assigned to the second LSP, data traffic on the second LSP.

9. The method of claim 8, wherein receiving the message configuring the ingress router to assign the new protocol priority value to the second LSP further comprises receiving the message as part of a message configuring the ingress router to establish the second LSP associated with the second protocol.

10. The method of claim 8,
    wherein the first LSP comprises a Resource Reservation Protocol (RSVP) LSP, and
    wherein the second LSP comprises a Source Packet Routing in Networking (SPRING) LSP.

11. The method of claim 10, wherein receiving the message via the configuration session comprises receiving a Path Computation Element Protocol (PCEP) update message via a PCEP session between the controller and the ingress router.

12. The method of claim 11, wherein receiving the PCEP update message comprises receiving a Type, Length, and Value of an LSP object that includes the new protocol priority value assigned to the second LSP.

13. The method of claim 11, wherein receiving the PCEP update message comprises receiving a Type, Length, and Value of a vendor-specified object that includes the new protocol priority value assigned to the second LSP.

14. The method of claim 8,
    wherein the message further comprises a new protocol priority value assigned to the first LSP, and
    wherein the new protocol priority value assigned to the first LSP is lower than the new protocol priority value assigned to the second LSP.

15. A controller that manages a plurality of network devices in a network comprising:
a memory; and
one or more processors operably coupled to the memory, wherein the one or more processors are configured to:
establish a first Label Switched Path (LSP) associated with a first protocol;
receive a request to assign a new protocol priority value to a second LSP associated with a second protocol, wherein an initial protocol priority value assigned to the first LSP and an initial protocol priority value assigned to the second LSP each indicate a priority of a corresponding protocol for routing traffic, and wherein the initial protocol priority value assigned to the first LSP is higher than the initial protocol priority value assigned to the second LSP; and
in response to the receipt of the request, send, via a configuration session to an ingress router of the first LSP and the second LSP, a message configuring the ingress router to assign the new protocol priority value to the second LSP, the message specifying the new protocol priority value assigned to the second LSP, wherein the new protocol priority value assigned to the second LSP is higher than the initial protocol priority value assigned to the first LSP.

16. The controller of claim 15,
wherein, to receive the request to assign the new protocol priority value to the second LSP, the one or more processors are further configured to receive the request as part of a request to establish the second LSP associated with the second protocol, and
wherein, to send the message, the one or more processors are further configured to send the message directing the ingress router to establish the second LSP.

17. The controller of claim 15,
wherein the first LSP comprises a Resource Reservation Protocol (RSVP) LSP, and
wherein the second LSP comprises a Source Packet Routing in Networking (SPRING) LSP.

18. The controller of claim 15, wherein, to send the message via the configuration session, the one or more processors are configured to send a Path Computation Element Protocol (PCEP) update message via a PCEP session between the controller and the ingress router.

19. The controller of claim 18, wherein, to send the PCEP update message, the one or more processors are configured to send a Type, Length, and Value of an LSP object that includes the new protocol priority value assigned to the second LSP.

20. The controller of claim 18, wherein, to send the PCEP update message, the one or more processors are configured to send a Type, Length, and Value of a vendor-specified object that includes the new protocol priority value assigned to the second LSP.

21. The controller of claim 15,
wherein the message further comprises a new protocol priority value assigned to the first LSP, and
wherein the new protocol priority value assigned to the first LSP is lower than the new protocol priority value assigned to the second LSP.

22. A router comprising:
a memory; and
one or more processors operably coupled to the memory, wherein the one or more processors are configured to:
establish a first Label Switched Path (LSP) associated with a first protocol;
receiving, via a configuration session with a controller that manages a plurality of network devices including the router, a message configuring the router to assign a new protocol priority value to a second LSP associated with a second protocol, the message specifying the new protocol priority value assigned to the second LSP,
wherein an initial protocol priority value assigned to the first LSP and an initial protocol priority value assigned to the second LSP each indicate a priority of a corresponding protocol for routing traffic,
wherein the initial protocol priority value assigned to the first LSP is higher than the initial protocol priority value assigned to the second LSP, and
wherein the new protocol priority value assigned to the second LSP is higher than the initial protocol priority value assigned to the first LSP;
update the initial protocol priority value assigned to the second LSP with the new protocol priority value assigned to the second LSP; and
send, based on the new protocol priority value assigned to the second LSP, data traffic on the second LSP.

23. The router of claim 22, wherein, to receive the message for directing the router to assign the new protocol priority value to the second LSP, the one or more processors further configured to receive the message as part of a message for directing the router to establish the second LSP associated with the second protocol.

24. The router of claim 22,
wherein the first LSP comprises a Resource Reservation Protocol (RSVP) LSP, and
wherein the second LSP comprises a Source Packet Routing in Networking (SPRING) LSP.

25. The router of claim 22, wherein, to receive the message via the configuration session, the one or more processors are configured to send a Path Computation Element Protocol (PCEP) message via a PCEP session between the controller and the router.

26. The router of claim 25, wherein, to send the PCEP update message, the one or more processors are configured to send a Type, Length, and Value of an LSP object that includes the new protocol priority value assigned to the second LSP.

27. The router of claim 25, wherein, to send the PCEP update message, the one or more processors are configured to send a Type, Length, and Value of a vender-specified object that includes the new protocol priority value assigned to the second LSP.

28. The router of claim 22,
wherein the message further comprises a new protocol priority value assigned to the first LSP, and
wherein the new protocol priority value assigned to the first LSP is lower than the new protocol priority value assigned to the second LSP.

* * * * *